United States Patent [19]
Cisneros

[11] Patent Number: 6,092,605
[45] Date of Patent: Jul. 25, 2000

[54] HORSESHOE TRACTION DEVICES AND SYSTEMS

[76] Inventor: Timothy L. Cisneros, 218 Forest View Dr., South San Francisco, Calif. 94080

[21] Appl. No.: 09/055,735

[22] Filed: Apr. 6, 1998

[51] Int. Cl.[7] .................................. A01L 1/00; A01L 3/00
[52] U.S. Cl. .................................................. 168/11; 168/30
[58] Field of Search .................................. 168/4, 11, 17, 168/21, 29, 30, 34, 43, DIG. 2

[56] References Cited

U.S. PATENT DOCUMENTS

| 93,654 | 8/1869 | Whitehead | 168/34 |
|---|---|---|---|
| 279,223 | 6/1883 | Chase | 168/29 |
| 666,583 | 1/1901 | Williams | 168/29 |
| 1,327,493 | 1/1920 | Schwoyer . | |
| 1,403,387 | 1/1922 | Bumbaugh . | |
| 1,471,119 | 10/1923 | Giles . | |
| 1,476,867 | 12/1923 | Wunderlich . | |
| 3,811,512 | 5/1974 | Sirles | 168/34 |
| 4,122,900 | 10/1978 | Barr et al. | 168/12 |
| 4,386,660 | 6/1983 | Sparks | 168/32 |
| 4,645,008 | 2/1987 | Benning | 168/11 |
| 4,757,864 | 7/1988 | Juncker | 168/11 |
| 4,760,885 | 8/1988 | Benning | 168/11 |
| 4,765,412 | 8/1988 | Colonel et al. | 168/15 |
| 5,027,904 | 7/1991 | Miller et al. | 168/4 |
| 5,076,366 | 12/1991 | Liskey | 168/12 |
| 5,343,957 | 9/1994 | Chapman | 168/11 |
| 5,421,415 | 6/1995 | Wells | 168/4 |

FOREIGN PATENT DOCUMENTS

| 32536 | 4/1908 | Austria | 168/29 |
|---|---|---|---|
| 1013 | 3/1887 | Sweden | 168/34 |
| 22102 | 3/1907 | Sweden | 168/11 |
| 33414 | of 0000 | Switzerland | 168/29 |
| 23990 | of 1894 | United Kingdom | 168/29 |
| 202498 | 8/1923 | United Kingdom | 168/30 |

OTHER PUBLICATIONS

Thoro'Bred Racing Plate Co., Inc. catalog.
The Victory Racing Plate Company catalog.

*Primary Examiner*—Michael J. Carone
*Assistant Examiner*—Son T. Nguyen
*Attorney, Agent, or Firm*—Townsend and Townsend and Crew LLP

[57] ABSTRACT

The present invention provides improved racing horseshoe cleats and horseshoe traction systems. In one embodiment, a horseshoe traction system (100) comprises a horseshoe (102) having a curved medial portion (104) ending in two heel portions (106), an upper surface (108) adapted to engage a horse's hoof and a lower surface (110). A cleat (10) is removably attachable to the horseshoe lower surface. The cleat comprises a base portion (12) and a generally X-shaped projection (20) extending from the base. The X-shaped projection provides anterior to posterior, as well as lateral stability.

26 Claims, 9 Drawing Sheets

HORSESHOE TRACTION DEVICES AND SYSTEMS

BACKGROUND OF THE INVENTION

The present invention relates to the field of farrier, the art and science of horseshoeing, and more particularly, to cleats for use with horseshoes.

The sport of horseracing has been around for centuries, and with its development, inventions have arisen related to improving a horse's racing performance. One such area of improvement involves the development of horseshoes specifically designed for racing horses. Racing horseshoes typically are made of steel or aluminum, such as a lightweight aluminum alloy, and are often referred to as racing plates. A typical racing plate is affixed to a horse's hoof by driving nails through holes in the racing plate and into the horse's hoof. The underside of the racing plate also typically has an arcuate blade located near the curved middle portion of the horseshoe. This blade provides some additional traction near the front or "toe" portion of the hoof.

For horses that run on muddy surfaces or on grass, racing plates typically do not provide sufficient traction. As a result, it is desirable to use additional traction devices affixed to the bottom of the horseshoes.

As a racing horse's hoof strikes the track's surface, it typically slides forward slightly. Further, a horse's hoof tends to slide sideways slightly due to centrifugal force, particularly when the horse is rounding a turn. A driving hoof further loses traction and slides backwards slightly as the hoof reaches the end of its stride. These sliding movements of a horse's hoof, particularly the lateral movements, are a major source of equine injury to the horse's lower leg or ankle, including ligament and cartilage damage.

In an attempt to reduce slippage, and as a result improve the horse's racing performance and reduce the likelihood of injury, several horseshoes have adopted traction features on the underside of the horseshoe. For example, aluminum alloy racing plates may have a pattern of steel calks or cleats affixed to the underside of the horseshoe to help provide additional traction. These racing plates typically have the calks cast in place or firmly affixed to the shoe and typically require the removal of the horseshoe in order to change the calks.

Unfortunately, the present array of racing horseshoe cleats or calks are deficient in any of a number of areas. For example, some calks are designed primarily for improved anterior to posterior traction without providing improved lateral traction or stability. Some calks can be attached to the racing plate in only a limited number of positions, or only a single position. Other calks only can be removed with the removal of the horseshoe. Still others are made from materials that add an undesirable amount of extra weight to the horseshoe. Still others, such as calks commonly referred to as jar calks, when placed on a horse's hoof that is more rounded cause the leg to twist if the hoof lands other than flat.

SUMMARY OF THE INVENTION

The present invention provides improved racing horseshoe cleats and horseshoe traction systems designed to overcome at least some of the shortcomings of the prior art. Traction devices and systems of the present invention are highly adaptable for use in a variety of racing formats and racing track conditions, including muddy, icy or turf (grass) surfaces. The present invention provides traction devices which can be added to and removed from a racing horseshoe without the need to remove the shoe itself, and which can be attached to the horseshoe and horse's hoof in a variety of positions. The traction devices are designed from material that is lightweight and yet provides sufficient resiliency, stability and strength. Further, the present invention provides a cleat configuration that facilitates not only sufficient anterior to posterior traction for a race horse, but also improved lateral stability and traction over prior art devices, thereby likely reducing the risk of injury to the horse's ankles and lower legs.

In one embodiment of the present invention, a horseshoe cleat is provided having a base adapted to engage a horseshoe and a generally X-shaped projection extending from the base. At least part of the present invention is the recognition that having a generally X-shaped cleat projection provides desired lateral traction characteristics as well as sufficient anterior to posterior traction. In one aspect, the base is generally trough-shaped with a curved middle portion, and inner and outer lips extending from the middle portion. The middle portion is curved so that the cleat base can engage a horseshoe in a variety of positions around the horseshoe. The middle portion and lips each have a horseshoe engaging surface and an outer surface. The generally X-shaped projection extends from the middle portion of the cleat base in a direction generally opposite the lips and is designed to engage the track or other racing surface.

In one aspect, the generally X-shaped projection is closer to one end of the cleat base. The projection may also be placed near or in the middle of the cleat base.

The horseshoe cleat preferably comprises plastic, and more preferably a thermoplastic. The cleat may comprise glass-filled nylon, acetal, acrylonitrile-butadine-styrene (ABS), polycarbonate (such as that sold under the brand name LEXAN), ultra-high molecular weight (UHMW) plastic, polypropelene or the like. The use of such a material provides adequate strength to the cleat as it incurs the pounding of a running horse weighing hundreds of pounds. Preferably, the cleat base and projection comprise a single piece of molded plastic. Alternatively, the base and projection can be constructed separately and then affixed to one another using adhesive or the like.

The cleat base middle portion preferably has a length between about 1½ inches and about 2½ inches, and a width between about ½ inch and about ¾ inch. In particular, the cleat base is designed to fit snugly into and/or around an underside of a racing horseshoe. To facilitate this engagement, in one aspect the horseshoe cleat has a ridge extension extending from the base middle portion which operably engages a corresponding groove on the underside of the horseshoe. The cleat lips preferably have a height that is less than about eight (8) millimeters, thereby preferably extending at least part way up the side of a horseshoe. In this manner, the lips facilitate the appropriate fit between the cleat and a horseshoe without extending into the horse's hoof which could possibly bruise or irritate the horse's hoof.

The generally X-shaped projection has a central hub having a height that is preferably between about five (5) millimeters and about twenty (20) millimeters measured from the cleat base middle portion outer surface. This generally X-shaped projection preferably comprises four (4) ridges intersecting at the central hub. Each ridge has a width that preferably is between about one (1) millimeter and about six (6) millimeters, and a length preferably between about five (5) millimeters and about fifteen (15) millimeters. In one particular aspect, each ridge has an end opposite the central hub having a height that is less than the central hub height. The ridges further may have a variable width, for example, the ridge width may be wider adjacent the cleat base than near the top of the ridge. In this fashion, the ridges may taper down to a relatively narrow width where the ridge contacts the running surface compared to the ridge width where the ridge and cleat base connect.

Further, each ridge forms an angle with an adjacent ridge that preferably is between about 60 degrees and about 120 degrees. Such an X-shaped configuration facilitates both anterior to posterior as well as lateral stability of the horseshoe during the running of a race on a wide range of track conditions.

The cleat is preferably formed with at least one hole through the base middle portion, and more preferably, at least two spaced apart holes through the base middle portion. These holes are designed to allow a farrier to affix the cleat firmly to a horse's hoof by driving a fastener, such as a nail or the like, through the cleat hole, through a hole in the horseshoe which has been aligned with the cleat hole, and into the horse's hoof. The use of cleat holes also avoids the need to drive a nail through the cleat base, thereby reducing the likelihood of cleat damage or breakage.

In an alternative embodiment, the cleat includes a base adapted to engage a horseshoe and a generally star-shaped projection extending from the base. The star-shaped projection preferably includes eight ridges joined at a central hub. The hub has a height that preferably is between about five (5) millimeters and about twenty (20) millimeters. Each ridge has a width that preferably is between about one (1) millimeter and about six (6) millimeters measured where the ridge connects with the cleat base, and a length that preferably is between about five (5) millimeters and fifteen (15) millimeters. In one aspect, each ridge has an end opposite the central hub having a height that is less than the central hub height. In this manner, the ridges are beveled or tapered down as they extend out from the central hub.

The present invention further provides a horseshoe traction system including a horseshoe having a curved medial portion ending in two heel portions, an upper surface adapted to engage a horse's hoof and a lower surface. The traction system further includes at least one cleat removably attachable to the horseshoe lower surface. The cleat has a base portion and a generally X-shaped projection extending from the base.

In one aspect, the cleat is removably attached to one of the horseshoe heel portions. Alternatively, the cleat is removably attached to the horseshoe medial portion. Depending in part on the particular horse and the track conditions, it may be desirable to use a horseshoe traction system having just one cleat with the horseshoe. In one aspect, at least two cleats are removably attached to the horseshoe. The cleats can be attached to the horseshoe medial portion on opposing sides of a center of the medial portion. Alternatively, each cleat may be removably attached to one of the horseshoe heel portions. In still another aspect, at least four cleats are removably attached to the horseshoe.

The cleat base lips preferably are designed to extend at least part way over the outer edges or rims of the racing horseshoe. Such an arrangement facilitates the cleat being removably attached to the horseshoe. As previously noted, the cleat preferably has at least one hole, and more preferably, at least two holes formed in the cleat base for receiving nails to further affix the cleat to the horse's hoof. This is accomplished by aligning one or more holes in the cleat base with one or more holes in the horseshoe, and driving a nail through an aligned pair of holes into the hoof.

In one aspect, the cleat comprises a plastic. In another aspect, the cleat comprises a single piece of molded plastic.

In still another embodiment, the horseshoe traction system includes a horseshoe as previously described, and at least one cleat removably attachable to the horseshoe's lower surface. The cleat includes a base portion and a generally star-shaped projection extending from the base.

Other features and advantages of the invention will appear from the following description in which the preferred embodiment has been set forth in detail in conjunction with the accompanying figures.

DESCRIPTION OF THE PREFERRED EMBODIMENT

Figure 1A:
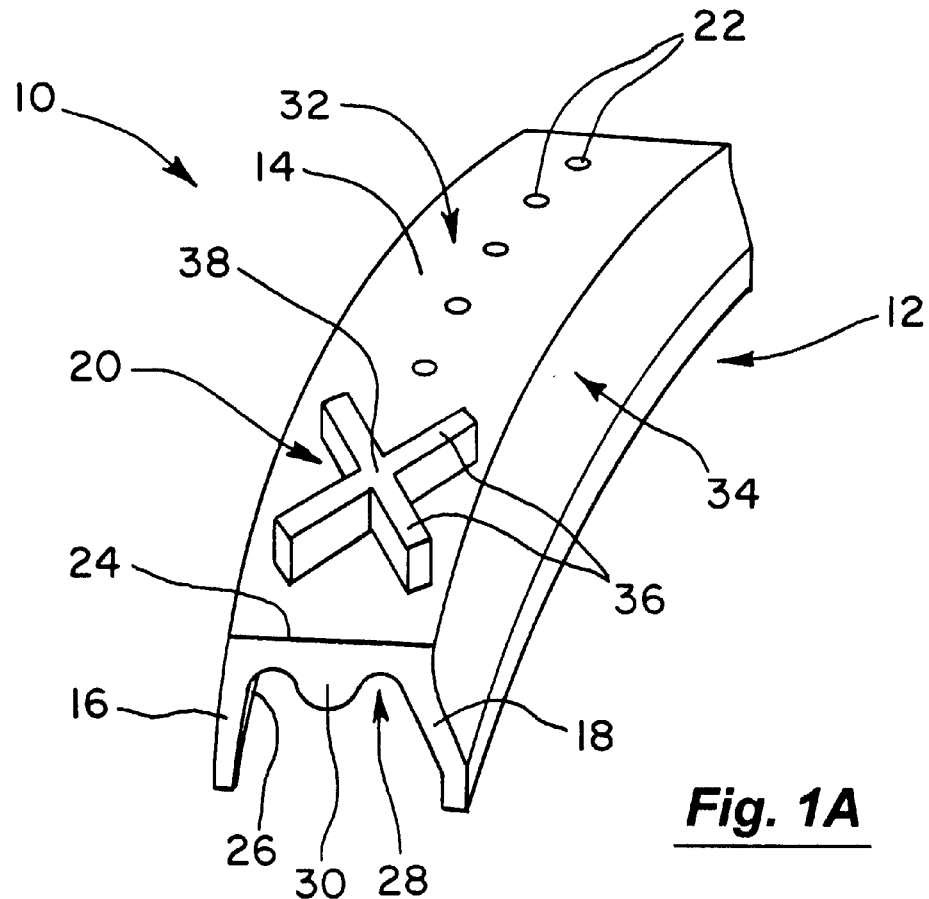
FIG. 1A is an overall view of a horseshoe traction device according to the present invention.
Figure 1B:
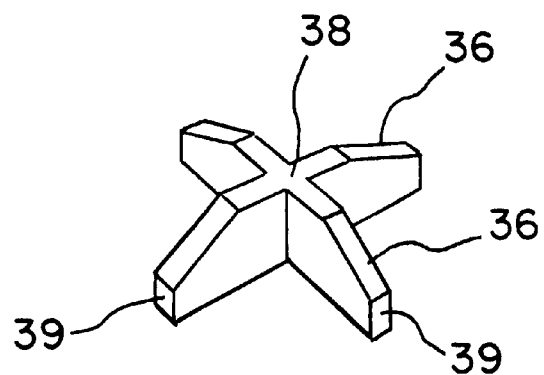
FIG. 1B is an overall view of an alternative cleat projection for use with the traction device depicted in FIG. 1A.

Turning now to FIGS. 1A and 1B, a horseshoe traction device according to the present invention will be described. FIG. 1A depicts a horseshoe cleat 10. Cleat 10 comprises a base 12 having a curved middle portion 14, an outer lip 16 and an inner lip 18 extending from curved middle portion 14. An X-shaped projection 20 extends from cleat middle portion 14 in a direction generally opposite lips 16, 18. Cleat middle portion 14 is formed with a plurality of holes 22 therethrough. FIG. 1A depicts cleat 10 having five holes 22, although a greater or smaller number of holes can be used within the scope of the present invention. Further, holes 22 depicted in FIG. 1A are round, but holes 22 can have other shapes, such as square or rectangular, within the scope of the present invention. Lips 16, 18 have a lip horseshoe engaging surface 26 and middle portion 14 also has a middle portion horseshoe engaging surface 28. Cleat 10 is adapted to engage a horseshoe (not shown in FIG. 1A) in a manner that allows X-shaped projection 20 to contact a track or other surface.

To facilitate the engagement of cleat 10 with a horseshoe, a ridge extension 30 extends from horseshoe engaging surface 28 of middle portion 14. Ridge extension 30 has a length that preferably is the same as the length of middle portion 14, although shorter or longer lengths for ridge extension 30 are possible within the scope of the present invention. The function of such ridge extension 30 will be further described in conjunction with later figures.

Middle portion 14 has an outer surface 32 from which X-shaped projection 20 extends. Lips 16, 18 also have an outer surface 34. In one embodiment, inner lip 18 is beveled. This beveled configuration is used to facilitate the engagement of cleat 10 with a horseshoe having a similar beveled configuration.

Base 12 and X-shaped projection 20 preferably comprise a plastic, and more preferably, a thermoplastic. Such a material is lightweight, and provides sufficient resiliency and strength to cleat 10, allowing it to endure the pounding of a running horse on a wide range of track surfaces and surface conditions without serious degradation of cleat 10. Cleat 10, including base 12 and X-shaped projection 20, preferably comprise a single piece of molded plastic. Base 12 and X-shaped projection 20 also can be separate pieces, operably attached together with adhesive or the like.

Cleat base middle portion 14 preferably has a length between about 1½ inches and about 2½ inches, and a width between about ½ inch and about ¾ inch. Such dimensions facilitate the engagement of cleat 10 with the horseshoe. In one embodiment, middle portion 14 has a length that is about two (2) inches and a width that is about five eighths (⅝) of an inch.

X-shaped projection 20 preferably comprises four ridges 36 joined at a central hub 38. Central hub 38 preferably has a height that is between about five (5) millimeters and about twenty (20) millimeters measured from the middle portion outer surface 32. In one embodiment, central hub 38 has a height that is about one half (½) of an inch. Each ridge 36 further has a width that is preferably between about one (1) millimeter and about six (6) millimeters, and a length that is preferably between about five (5) millimeters and about fifteen (15) millimeters. Each ridge 36 forms an angle with an adjacent ridge 36 that is between about sixty (60) degrees and about one hundred and twenty (120) degrees, and more preferably is about ninety (90) degrees.

FIG. 1B depicts an alternative cleat projection 20 for use with cleat 10. As depicted, each ridge 36 connects to central hub 38 and extends outward to a ridge end 39. In this configuration, ridges 36 are tapered or beveled so that ridge end 39 has a shorter height than central hub 38. Such a configuration provides exemplary traction while reducing the profile of ridges 36. Some horses, when in full stride, strike opposing legs with their hoof. The cleat configuration shown in FIG. 1B helps reduce the likelihood of injury that may be caused by the cleat striking a horse's leg.

Such a generally X-shaped configuration, as depicted in FIGS. 1A and 1B, provides sufficient anterior to posterior stability and traction for a running horse using cleat 10, and provides the further benefit of increasing the lateral stability and traction of that same cleat-wearing horse. At least a portion of the present invention is the recognition that the use of such X-shaped projection 20 facilitates the lateral stability of a racehorse, thereby likely reducing the risk of injury to the horse's ankles and lower legs.

Figure 2A:
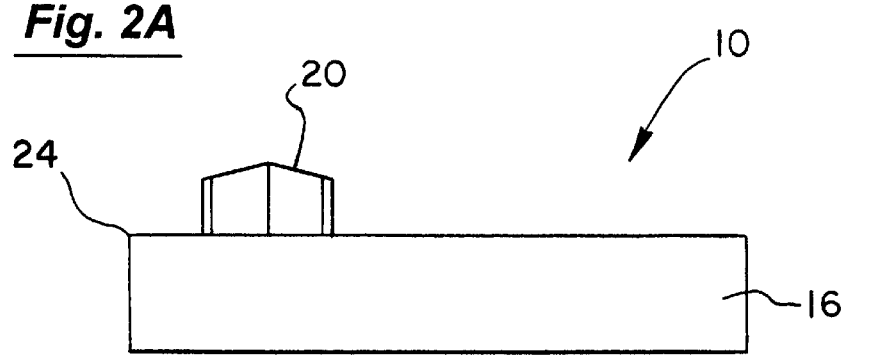
FIGS. 2A and 2B are side views of the horseshoe traction device depicted in FIG. 1A.
Figure 2B:
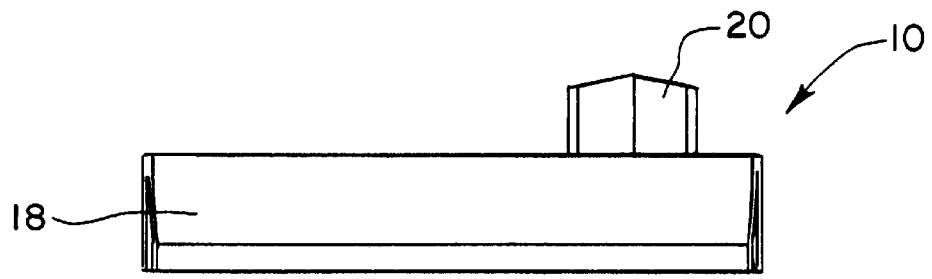
Figure 2C:
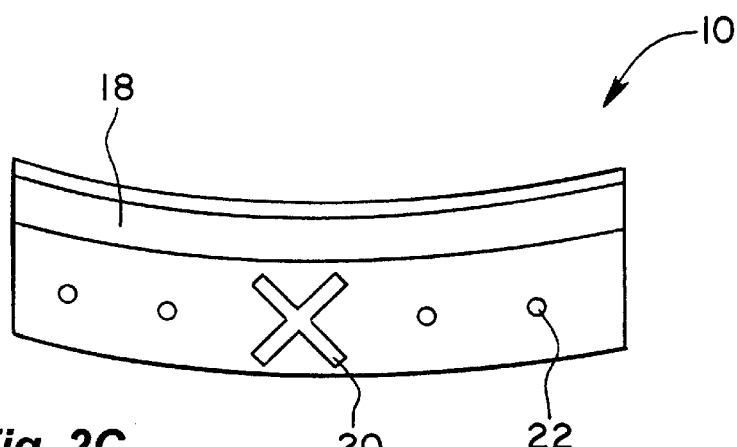
FIG. 2C is a top view of the horseshoe traction device depicted in FIG. 1A showing the cleat projection in the approximate center of the cleat base middle portion.

FIG. 2A depicts a side view of cleat 10 showing outer lip 16, and indicates the position of X-shaped projection 20 closer to one end edge 24 of middle portion 14. Alternatively, X-shaped projection 20 can be placed elsewhere along the middle portion 14, including at or near the center of middle portion 14 (as seen in FIG. 2C). FIG. 2B depicts inner lip 18 of cleat 10 as a beveled lip.

Figure 2D:
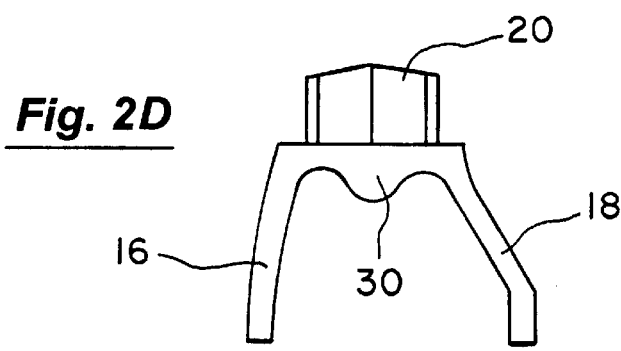
FIG. 2D is an end view of the horseshoe traction device depicted in FIG. 1A.

FIG. 2C depicts a top view of cleat 10 depicting the X-shaped projection 20 located in the approximate center of middle portion 14. In such a configuration, holes 22 are formed on either side or both sides of X-shaped projection 20. As best seen in FIG. 2D, ridge extension 30 extends from the horseshoe engaging surface 28 of middle portion 14 between inner lip 18 and outer lip 16. The X-shaped projection 20 extends from the middle portion 14 in a direction generally opposite lips 16, 18.

Figure 3A:
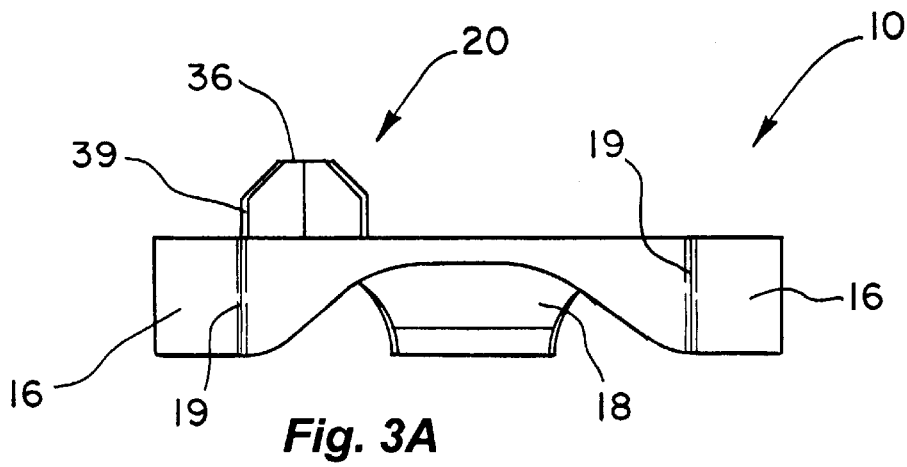
FIGS. 3A and 3B are side views of the horseshoe traction device depicted in FIG. 1 having lips forming movable tabs.
Figure 3B:
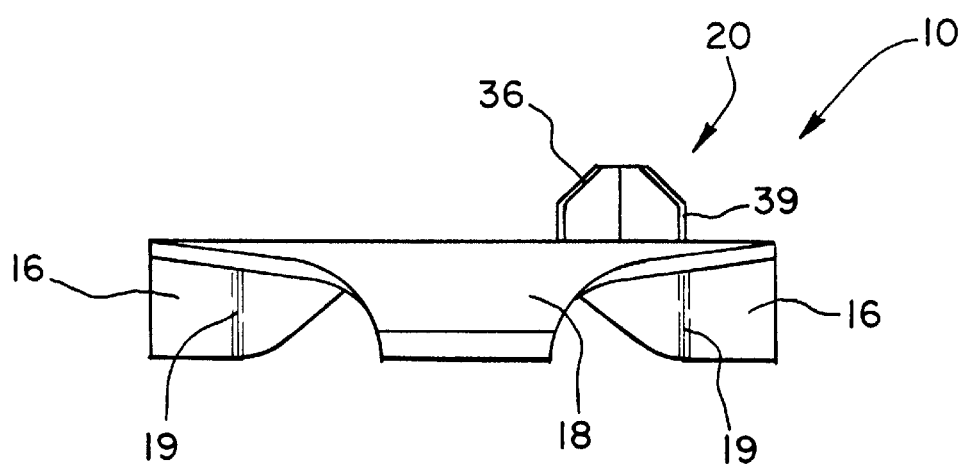
Figure 3C:
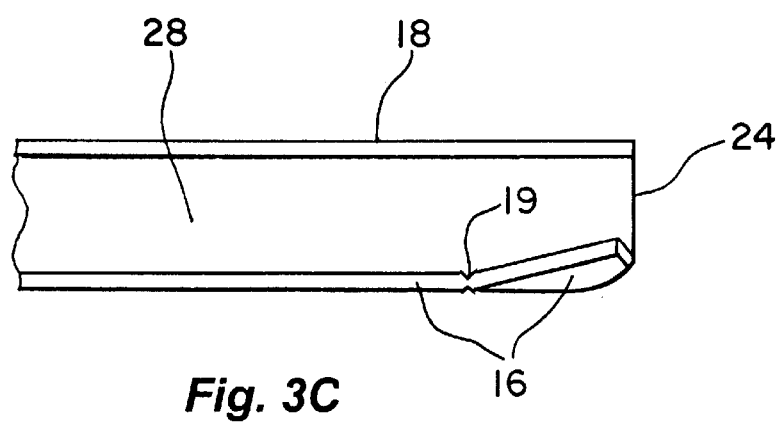
FIG. 3C depicts a bottom view of the traction device depicted in FIGS. 3A and 3B showing creases in outer lip 16.

FIGS. 3A and 3B depict side views of the horseshoe traction device depicted in FIG. 1, having lips 16, 18 forming movable tabs. As shown, lips 16 and 18 need not have a uniform height, but can have a variable height to form movable tabs. For example, inner lip 18 can be formed as shown in FIG. 3B so that lip 18 projects from middle portion 14 near the center of middle portion 14, and tapers down to have a shorter height near the ends 24 of middle portion 14. In this configuration, inner lip 18 forms a single tab which can be bent, for example bent inward or outward, to facilitate the engagement of cleat 10 with a horseshoe. Likewise, outer lip 16 can be formed so that lip 16 comprises tabs located near the two ends 24 of middle portion 14. Lip 16 tabs can be bent to facilitate the engagement of cleat 10 with a horseshoe. As best shown in FIG. 3C, lip 16 has at least one crease 19 to facilitate the bending of lip 16.

It will be appreciated that lips 16 and 18 can be formed to create different numbers and configurations of tabs. For example, inner lip 18 may be formed to create two or more tabs and outer lip 16 may comprise a single tab. Inner lip 18 further may have creases 19 to facilitate lip 18 engagement with a horseshoe.

Figure 4A:
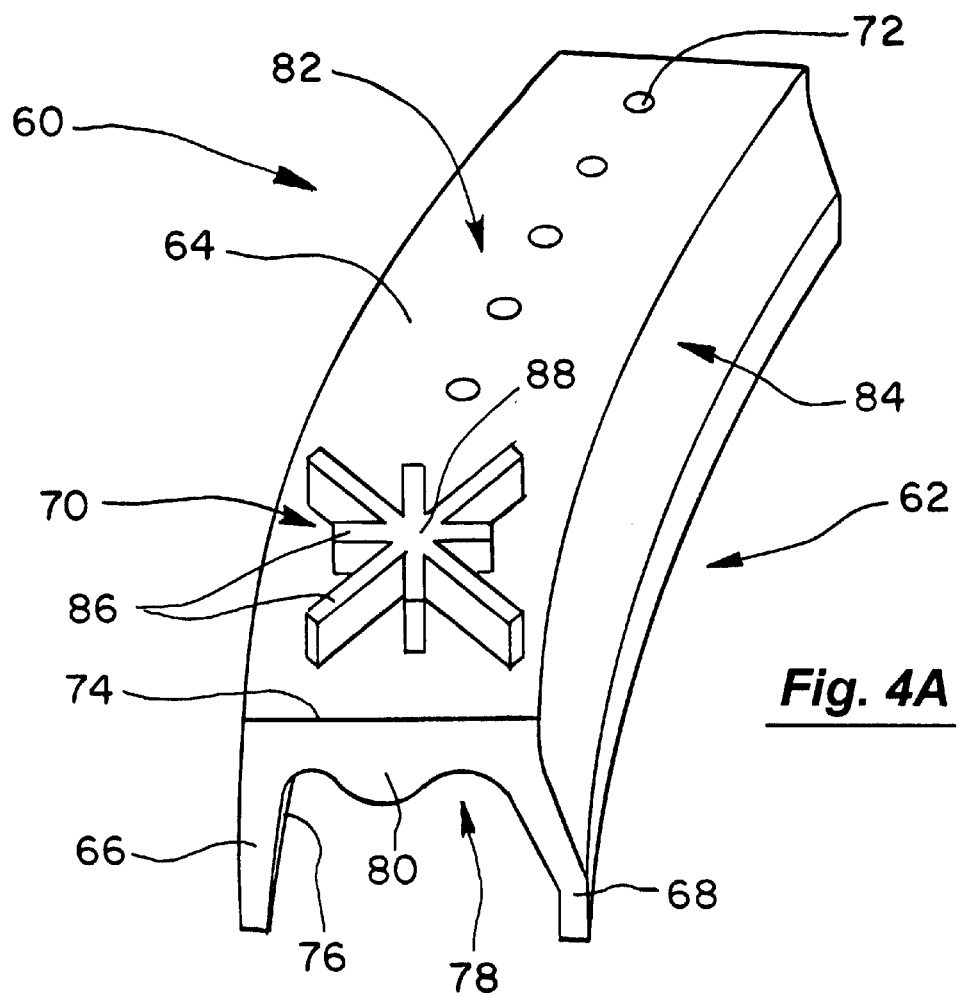
FIG. 4A is an overall view of an alternative embodiment of a horseshoe traction device according to the present invention having a generally star-shaped projection.

Turning now to FIG. 4A, an alternative embodiment of a horseshoe cleat 60 according to the present invention will be described. Horseshoe cleat 60 is ostensibly the same as horseshoe cleat 10 with the exception that a star-shaped projection 70 is used in lieu of X-shaped projection 20. Cleat 60 comprises a base 62 and star-shaped projection 70, with base 62 having a middle portion 64, an outer lip 66 and an inner lip 68. Holes 72 are provided in middle portion 64 as previously described. Star-shaped projection 70 is preferably located closer to one end edge 74 of middle portion 64, although it too may extend from or near the center of middle portion 64.

Cleat 60 further preferably comprises a ridge extension 80 extending from a horseshoe engaging surface 78 of middle portion 64. Ridge extension 80, in conjunction with a horseshoe engaging surface 76 of lips 66, 68 facilitates the engagement of cleat 60 with a horseshoe (as shown in later figures).

As shown in FIG. 4A, star-shaped projection 70 comprises eight ridges 86 which intersect at a central hub 88 as previously described in conjunction with X-shaped projection 20. Star-shaped projection 70 preferably has four ridges 86 having a length that is slightly longer than the length of four shorter ridges 86 spaced between the longer ridges 86. The four longer ridges 86 are similar in shape and appearance to X-shaped projection 20. Star-shaped projection 70 may have a larger or smaller number of ridges within the scope of the present invention. Further, the arrangement of longer and shorter ridges 86 may vary within the scope of the present invention to form star-shaped projection 70.

Figure 4B:
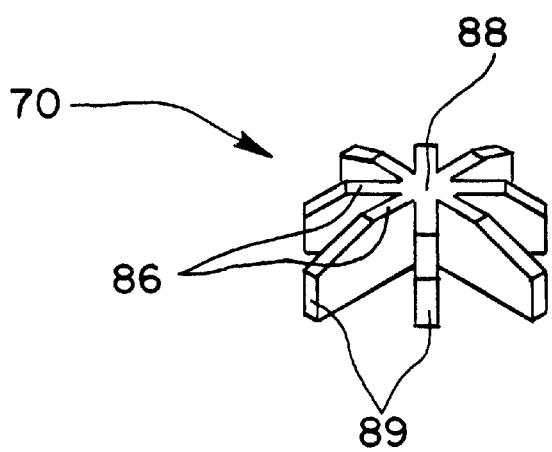
FIG. 4B is an overall view of an alternative cleat projection for use with the traction device depicted in FIG. 4A.

FIG. 4B depicts an alternative cleat projection 70 for use with cleat 60. As depicted, each ridge 86 connects to central hub 88 and extends outward to a ridge end 89. Cleat projection 70 depicted in FIG. 4B has similar features and benefits as cleat projection 20 depicted in FIG. 1B. Namely, ridges 86 are tapered or beveled so that ridge ends 89 have a shorter height than central hub 88. Such a configuration provides exemplary traction while reducing the profile of ridges 86.

The overall dimensions of cleat base 62, the middle portion 64 and lips 66, 68 are the same as described in conjunction with FIGS. 1 and 2. Central hub 88 of star-shaped projection 70 preferably has a height that is between about five (5) millimeters and about twenty (20) millimeters measured from an outer surface 82 of middle portion 64. Ridges 86 of star-shaped projection 70 have a width preferably between about one (1) millimeter and about six (6) millimeters, and a length preferably between about five (5) millimeters and about fifteen (15) millimeters.

Figure 5:
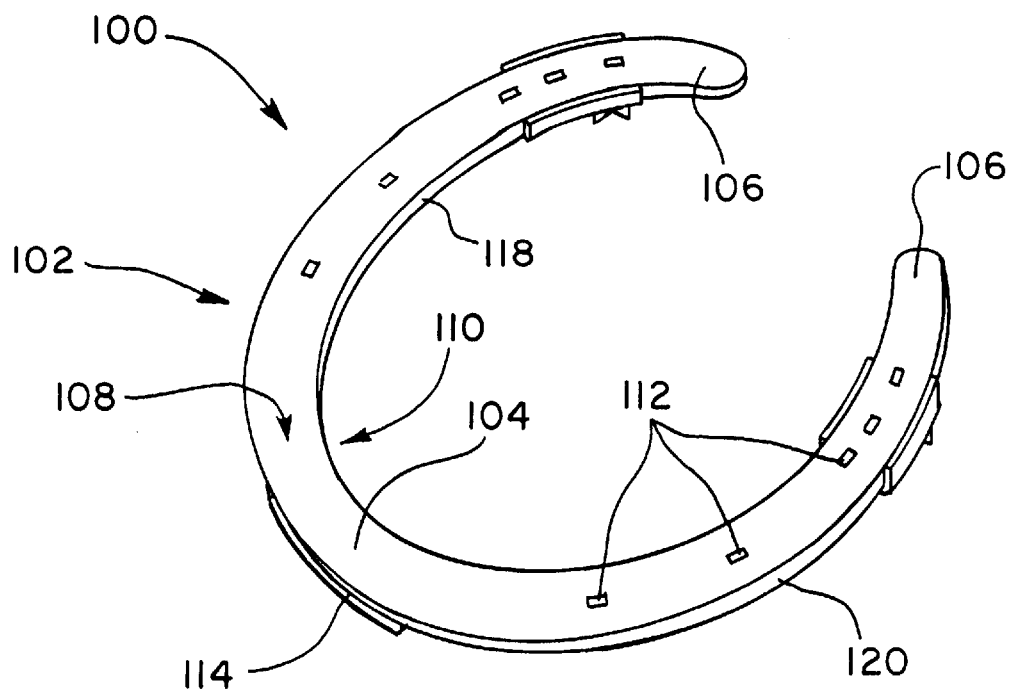
FIG. 5 is an overall view of a horseshoe traction system according to the present invention.
Figure 6:
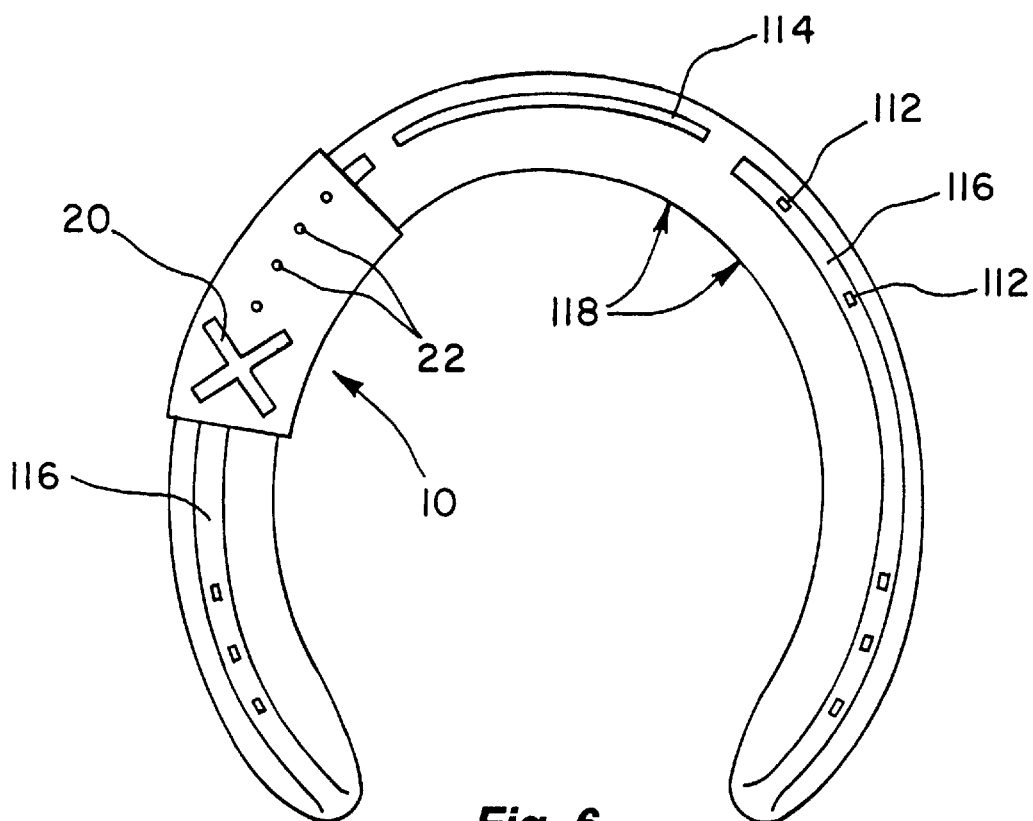
FIG. 6 is a plan view of the lower surface of a horseshoe traction system according to the present invention having a single cleat engaging the medial portion of the horseshoe.
Figure 7:
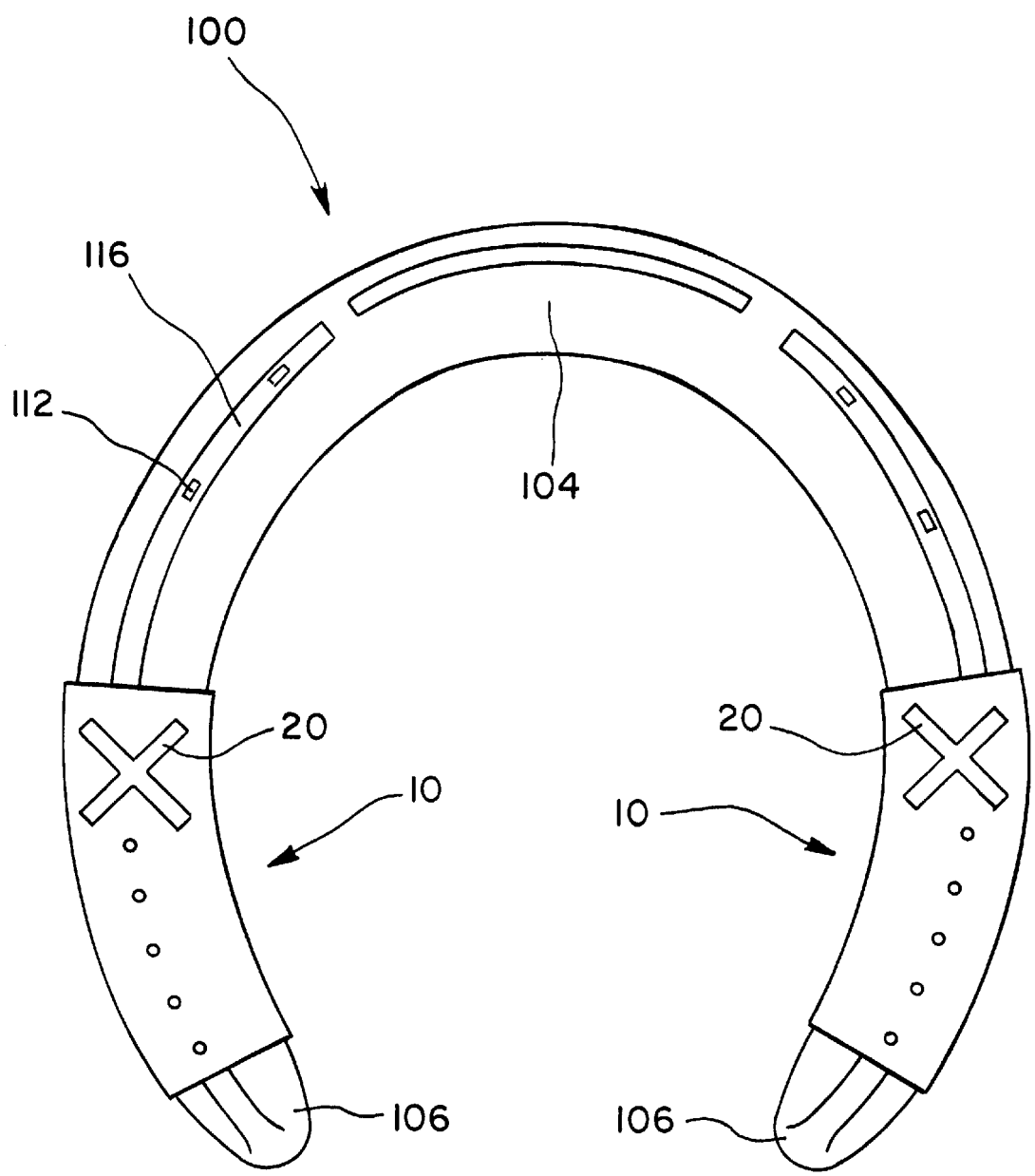
FIG. 7 is a plan view of the horseshoe traction system depicted in FIG. 6, having two horseshoe cleats engaging the heel portions of the horseshoe.
Figure 8:
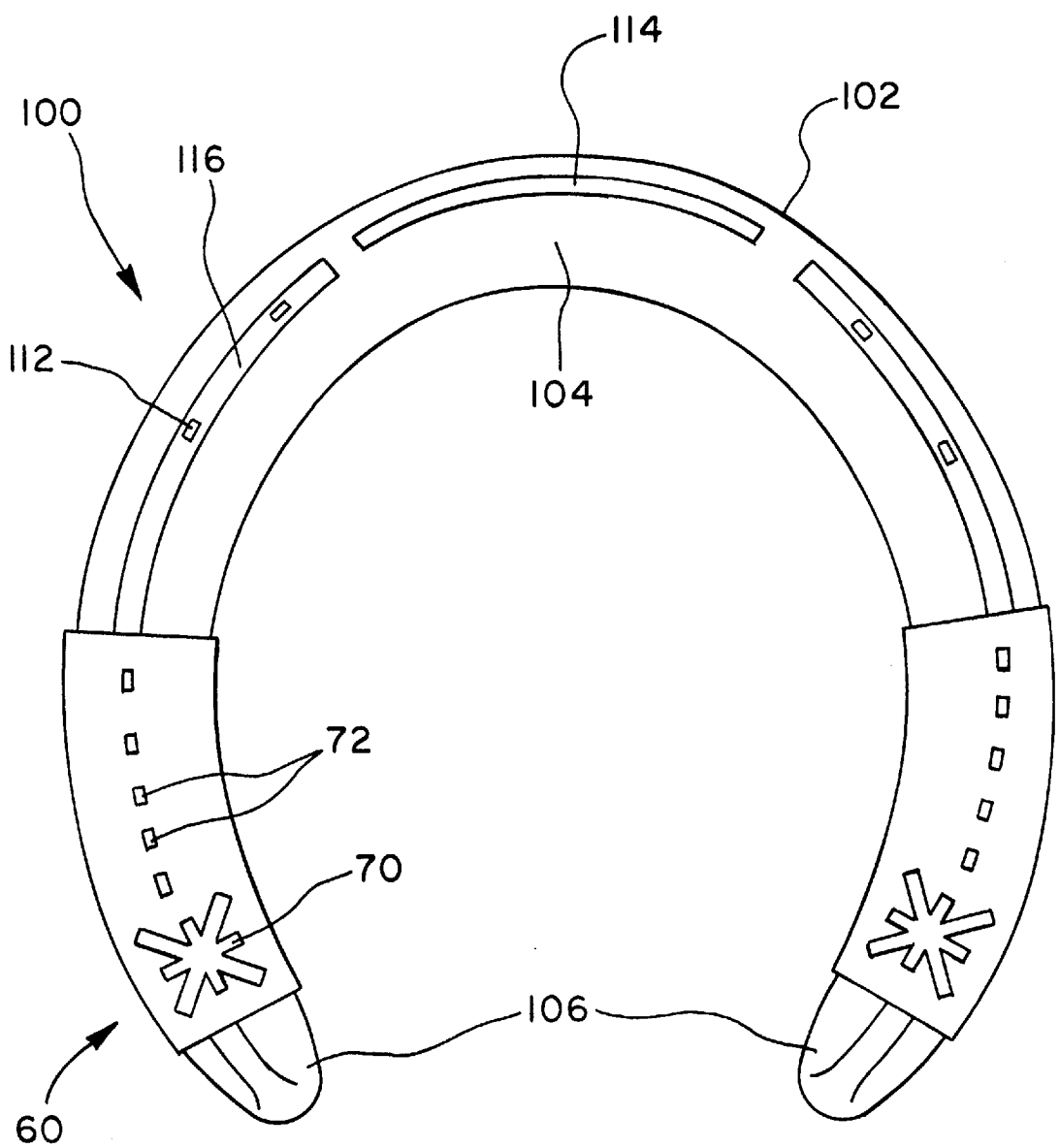
FIG. 8 is a plan view of an alternative embodiment of a horseshoe traction system according to the present invention having two horseshoe cleats with a generally star-shaped projection.

Turning now to FIG. 5, a horseshoe traction system according to the present invention will be described. Traction system 100 comprises a horseshoe 102 having a curved medial portion 104 ending in two heel portions 106. Horseshoe 102 comprises an upper surface 108 adapted to be operably attached to a horse's hoof (not shown) and a lower surface 110 (as best seen in FIGS. 6–8). Horseshoe 102 may comprise any of a number of horseshoes manufactured for racing horses, including horseshoes made from aluminum, aluminum alloys, steel, and like. For example, Thorobred Racing Plate Co., Inc. located in Anaheim, Calif., and Victory Racing Plate Co. located in Baltimore, Md. provide exemplary horseshoes which may be used as part of the horseshoe traction system according to the present invention. Horseshoe 102 preferably includes a plurality of holes 112 located in both medial portion 104 and heel portions 106. Holes 112 are designed to allow a nail or other attachment device to be driven through holes 112 and into the horse's hoof, thereby attaching horseshoe 102 to the hoof.

Racing horseshoes 102 further typically include an arcuate blade 114 located in the curved medial portion 104 of horseshoe 102. Such a blade 114 is designed to provide traction for the horse. Horseshoe traction system 100 further includes cleat 10 as previously described in conjunction with FIGS. 1 and 2. As shown in FIG. 6, one cleat 10 may be attached to horseshoe 102 as part of the horseshoe traction system 100. By aligning holes 22 in horseshoe cleat 10 with holes 112 in horseshoe 102, a nail or other attachment device (not shown) can be driven through an aligned pair of holes to affix cleat 10 to horseshoe 102 and the horse's hoof. Cleat 10 is designed to operably engage horseshoe 102 without the use of nails. However, the use of at least one nail is preferable for ensuring cleat 10 remains operably attached to a racing horseshoe 102 and a horse's hoof during operation. More preferably, at least two nails are used to operably attach cleat 10 to a horse's hoof. Cleat 10 has at least one hole 22, and preferably at least two holes 22 to allow cleat 10 to be placed in a variety of positions along the horseshoe lower surface 110. Providing cleat 10 with a plurality of holes 22 further allows cleat 10 to be used with a number of different racing plates made by different manufacturers.

Horseshoe 102 further typically includes a groove 116 in which holes 112 are formed. As previously described, cleat 10 preferably includes a ridge extension 30. Ridge extension 30 fits within groove 116 on horseshoe 102 to further assist cleat 10 in operably engaging horseshoe 102. As seen in FIG. 5, inner lip 18 and outer lip 16 extend at least part way up an inner rim 118 and an outer rim 120 of horseshoe 102, respectively. Lips 16, 18 preferably have a height that is less than about eight (8) millimeters to extend at least part way up horseshoe rims 118, 120. In one embodiment, lips 16, 18 each have a height that is between about five (5) and about six (6) millimeters. This arrangement further facilitates the engagement of cleat 10 with horseshoe 102. Inner lip 18 may also be beveled to facilitate cleat 10 engagement with horseshoe 102 when inner rim 118 is similarly beveled.

Turning now to FIG. 7, an alternative embodiment of horseshoe traction device 100 will be described. Horseshoe 102 and cleat 10 have been previously described in conjunction with earlier figures. As can be seen in FIG. 7, a pair of cleats 10 may be used to improve a horse's traction. In this configuration, at least one cleat hole 22 is aligned with at least one hole 112 in the heel portions 106 of horseshoe 102 to position X-shaped projection 20 in the approximate center of heel portion 106.

FIG. 8 depicts horseshoe traction system 100 of the present invention having two cleats 60 with star-shaped projections 70. As depicted in FIG. 8, at least one cleat hole 72 is aligned with at least one hole 112 in a manner which positions star-shaped projection 70 close to the end of heel portion 106.

The configurations depicted in FIG. 7 and 8 are interchangeable in that cleat 10 can be positioned as depicted in FIG. 8, and cleat 60 can be depicted as configured in FIG. 7. As can be appreciated, four cleats 10 and/or 60 can be operably attached to a horse's hoof by positioning two cleats 10 and/or 60 to engage heel portions 106 (as depicted in FIGS. 7 and 8) and two cleats 10 and/or 60 to engage the medial portion 104 of horseshoe 102 (as depicted in FIG. 6). In this manner, a wide range of configurations can be accomplished using from between one to four cleats 10, 60 in any given horseshoe traction system 100.

Figure 9:
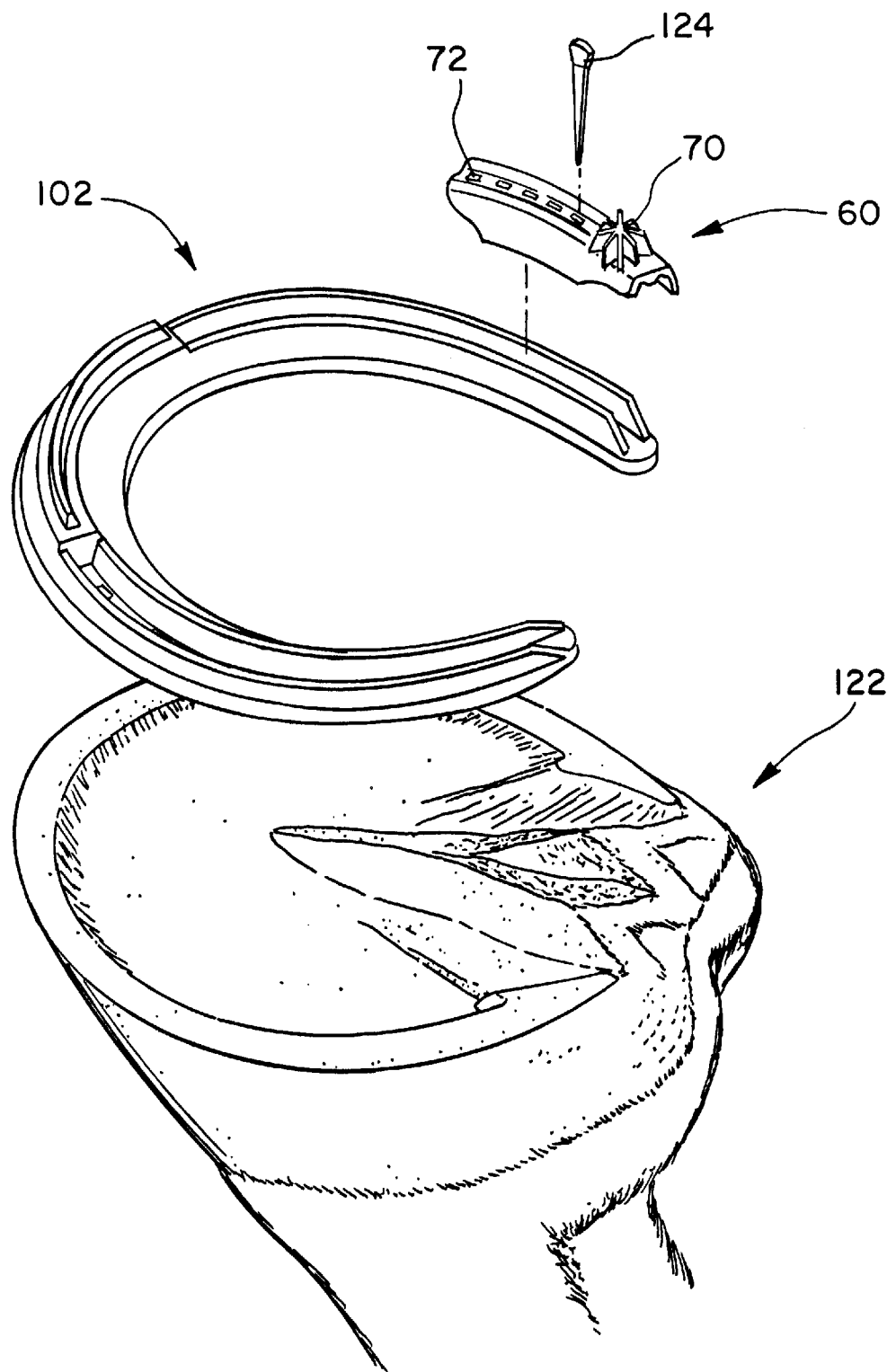
FIG. 9 is an exploded view of a horseshoe traction system according to the present invention shown with a horse's hoof.

Turning now to FIG. 9, horseshoe traction system 100 is shown in relation to a horse's hoof 122. As depicted, horseshoe 102 is aligned with hoof 122. Cleat 60 engages horseshoe 102 in a manner which aligns at least one hole 72 in cleat 60 with holes 112 in horseshoe 102. A nail 124 is aligned to be driven into and through aligned holes 72 and 112, and into hoof 122. In this manner, cleat 60 and horseshoe 102 are affixed to hoof 122 in a desired position.

Preferably, horseshoe 102 is affixed to hoof 122 with nails 124 before cleat 60 is attached. Cleat 60 can then be positioned so that at least one hole 72 is aligned with an unused hole 112 in horseshoe 102. In this manner, cleat 60 is able to be firmly affixed to hoof 122, and removed from hoof 122, without the need to remove horseshoe 102. To facilitate the removal of cleat 60 without the need to remove horseshoe 102, nails 124 are driven into hoof 122 in a manner which leaves at least a portion of the head of nail 124 extending above the cleat base middle portion outer surface 82. Such an arrangement permits the grasping and removal of nail 124 without the need to remove horseshoe 102. Alternatively, cleat 60 can engage horseshoe 102 before both cleat 60 and horseshoe 102 are affixed to hoof 122.

Figure 10A:
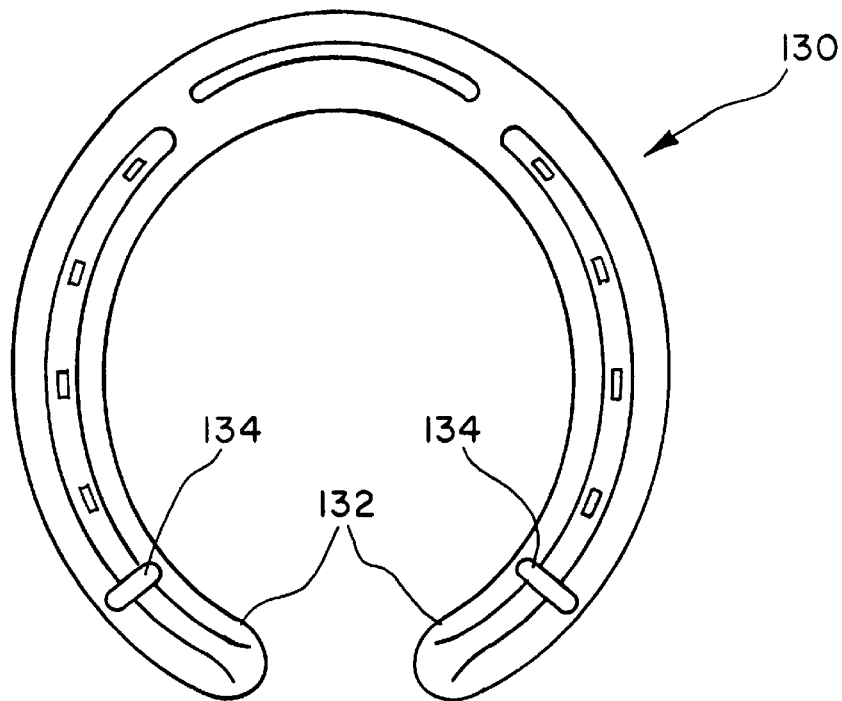
FIG. 10A depicts a prior art jar calk attached to a rounded horseshoe.
Figure 10B:
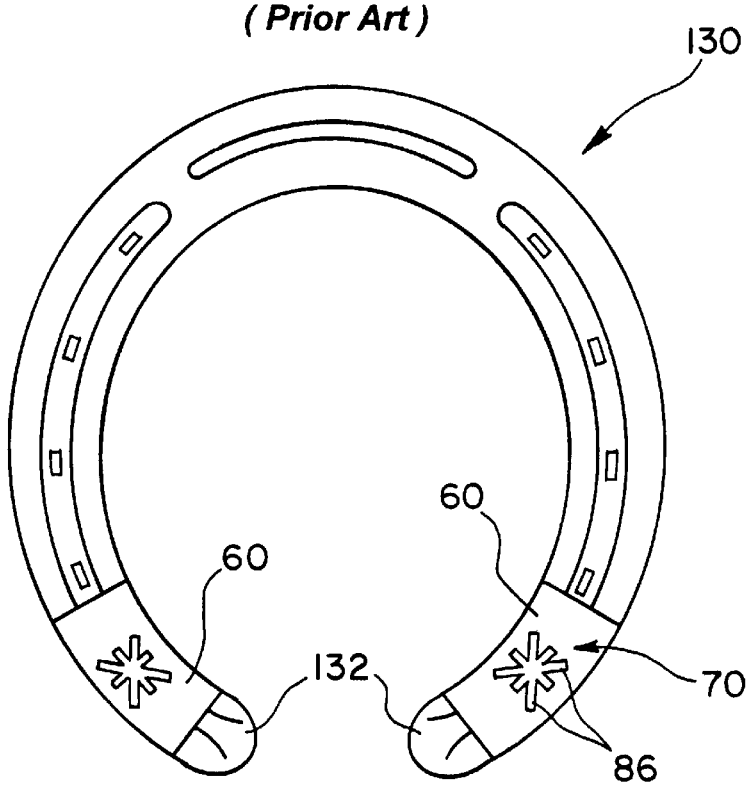
FIG. 10B depicts a horseshoe traction device according to the present invention attached to a rounded horseshoe.

Turning now to FIGS. 10A and 10B, one particular advantage of the present invention can be seen. FIG. 10A depicts a typical prior art jar calk 134 affixed to the heel portion of a rounded horseshoe 130. Depending on the shape of the horse's hoof, some shoes must have a rounded shape to be properly attached to the hoof. In the case of jar calks 134 and other prior art cleats having similar configurations, this rounded shoe turns the positioning of the calk in a manner which reduces its ability to provide traction assistance. As seen in FIG. 10A, jar calk 134, due to its use on rounded horseshoe 130, is no longer positioned generally perpendicular to the direction in which horseshoe 130 would move during a race. As a result, jar calk 134 affixed to more rounded horseshoe 130 does not provide as much anterior to posterior traction assistance as it would if affixed to a less rounded horseshoe. Further, the position of jar calk 134 may cause the horse's leg to twist when the hoof strikes the track surface.

In contrast, as shown in Fig. 10B, the present invention provides a cleat having a generally star-shaped or generally X-shaped projection which provides sufficient anterior to posterior, as well as sufficient lateral, traction and stability even with rounded horseshoes 130. Cleat projection 70 has a more uniform shape than jar calk 134. This allows at least some ridges 86 to be positioned to provide anterior to posterior and lateral traction and stability when used with a wide range of horseshoe shapes, including with more rounded horseshoes 130.

The invention has now been described in detail. However, it will be appreciated that certain changes and modifications may be made. For example, the description of features described in conjunction with FIGS. 1–10 are applicable to other embodiments of the horseshoe traction devices and horseshoe traction systems described herein. For example, horseshoe traction systems 100 depicting a cleat 10 having an X-shaped projection 20 can be practiced with a cleat 60 having a star-shaped projection 70. Therefore, the scope and content of this invention are not limited by the foregoing description, rather the scope and content are to be defined by the following claims.

What is claimed is:

1. A horseshoe cleat, comprising:
   a generally trough-shaped base adapted to inversely engage a horseshoe, said base having a curved middle portion and inner and outer lips extending therefrom to engage an inner edge and an outer edge of said horseshoe, respectively, without wrapping around onto a hoof-facing surface of said horseshoe;
   said inner lip having an angled portion extending from said base and a tip portion extending from said angled portion, said tip portion being generally perpendicular relative to said base;
   said outer lip being generally perpendicular relative to said base; and
   a generally X-shaped projection extending from said base in a direction generally opposite said lips.

2. A horseshoe cleat as in claim 1, wherein said middle portion further comprises two end edges, and wherein said projection extends from said middle portion closer to one of said end edges.

3. A horseshoe cleat as in claim 1, wherein said base and said projection comprise a composite plastic.

4. A horseshoe cleat as in claim 1, wherein said base and said projection comprise a thermoplastic.

5. A horseshoe cleat as in claim 1, wherein said base and said projection together comprise a single piece of molded plastic.

6. A horseshoe cleat as in claim 1, wherein said base middle portion has a length between about one and one-half (1½) inches and about two and one-half (2½) inches.

7. A horseshoe cleat as in claim 1, wherein said base middle portion has a width between about one-half (½) inch and about three fourths (¾) inch.

8. A horseshoe cleat as in claim 1, wherein said lips each have a height that is less than about 8 millimeters.

9. A horseshoe cleat as in claim 1, wherein said generally X-shaped projection has a central hub having a height that is between about five (5) millimeters and about ten (10) millimeters measured from said base middle portion.

10. A horseshoe cleat as in claim 1, wherein said generally X-shaped projection comprises four ridges joined at a central hub, said ridges each having a width between about one (1) millimeter and about six (6) millimeters, and a length between about five (5) millimeters and about fifteen (15) millimeters.

11. A horseshoe cleat as in claim 10, wherein each ridge forms an angle with an adjacent ridge that is between about sixty (60) degrees and about one hundred and twenty (120) degrees.

12. A horseshoe cleat as in claim 10, wherein each ridge has an end opposite said central hub having a height that is less than a height of said central hub.

13. A horseshoe cleat as in claim 1, wherein said cleat is formed with at least one hole through said base middle portion, said hole being adapted to receive a fastener.

14. A horseshoe cleat as in claim 1, wherein said cleat is formed with at least two spaced apart holes through said base middle portion, each of said holes being adapted to receive a fastener.

15. A horseshoe cleat as in claim 1, further comprising a ridge extension extending from a horseshoe engaging surface of said base middle portion, said ridge extension being adapted to engage a nail crease of said horseshoe.

16. A horseshoe traction system, comprising:
   a horseshoe having a curved medial portion ending in two heel portions, inner and outer edges, an upper surface adapted to engage a horse's hoof and a lower surface; and
   at least one cleat removably attachable to said horseshoe lower surface in one of a plurality of available locations, said cleat comprising
      a base portion having a curved middle portion with inner and outer lips extending therefrom, said lips adapted to extend part way up and engage said inner and outer horseshoe edges, respectively, without wrapping around onto said upper surface of said horseshoe;
      said inner lip having an angled portion extending from said base and a tip portion extending from said angled portion, said tip portion being generally perpendicular relative to said base;
      said outer lip being generally perpendicular relative to said base; and
      a generally X-shaped projection extending from said base portion.

17. A horseshoe traction system as in claim 16, wherein said cleat is removably attached to one of said horseshoe heel portions.

18. A horseshoe traction system as in claim 16, wherein said cleat is removably attached to said horseshoe medial portion.

19. A horseshoe traction system as in claim 16, further comprising at least two cleats removably attached to said horseshoe.

20. A horseshoe traction system as in claim 18, wherein each cleat is removably attached to said medial portion on opposing sides of a center of said medial portion.

21. A horseshoe traction system as in claim 18, wherein each cleat is removably attached to one of said heel portions.

22. A horseshoe traction system as in claim 16, further comprising at least four cleats removably attached to said horseshoe.

23. A horseshoe traction system as in claim 16, wherein said cleat base middle portion and said horseshoe are each formed with at least two holes, and wherein said cleat is fixedly attached to said horse's hoof by aligning two cleat holes with two horseshoe holes and driving a nail through each aligned pair of holes and into said hoof.

24. A horseshoe traction system as in claim 16, wherein said cleat comprises a composite plastic.

25. A horseshoe traction system as in claim 16, wherein said cleat comprises a single piece of molded plastic.

26. A method of affixing a removable horseshoe cleat to a horseshoe-wearing horse, said method comprising:

providing a horseshoe cleat comprising
- a generally trough-shaped base having a curved middle portion and inner and outer lips extending therefrom, said middle portion having at least one hole therethrough for receiving a nail; and
- a generally X-shaped projection extending from said base in a direction generally opposite said lips;

placing said cleat onto a bottom of said horseshoe, said base inversely engaging said horseshoe so that said lips extend part way up and engage inner and outer edges of said horseshoe without wrapping around onto a hoof-facing surface of said horseshoe;

aligning said at least one hole in said middle portion with a hole in said horseshoe to create at least one aligned pair of holes; and driving a nail through said aligned pair of holes into said horse hoof.

* * * * *